United States Patent
Mashima et al.

(10) Patent No.: US 8,976,493 B1
(45) Date of Patent: Mar. 10, 2015

(54) MAGNETIC READ SENSOR WITH NOVEL PINNED LAYER AND SIDE SHIELD DESIGN FOR IMPROVED DATA TRACK RESOLUTION AND MAGNETIC PINNING ROBUSTNESS

(71) Applicant: HGST Netherlands B.V., Amsterdam (NL)

(72) Inventors: Hideki Mashima, Odawara (JP); Tutomu Yasuda, Odawara (JP); Masashige Sato, Atsugi (JP); Masahiko Hatatani, Kamakura (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/103,719

(22) Filed: Dec. 11, 2013

(51) Int. Cl.
*G11B 5/127* (2006.01)

(52) U.S. Cl.
USPC ................................... 360/324.11

(58) Field of Classification Search
USPC ................................... 360/324.11
See application file for complete search history.

(56) References Cited

U.S. PATENT DOCUMENTS

| | | | |
|---|---|---|---|
| 5,729,413 | A | 3/1998 | Gooch et al. |
| 6,353,519 | B2 | 3/2002 | Pinarbasi |
| 6,620,530 | B1 | 9/2003 | Li et al. |
| 7,586,715 | B2 * | 9/2009 | Koyama et al. ............ 360/321 |
| 7,894,159 | B2 * | 2/2011 | Lengsfield et al. ...... 360/125.03 |
| 8,184,409 | B2 | 5/2012 | Xue et al. |
| 8,266,785 | B2 | 9/2012 | Freitag et al. |
| 8,270,110 | B2 | 9/2012 | Araki et al. |
| 8,335,051 | B2 | 12/2012 | Nunokawa et al. |
| 8,347,488 | B2 * | 1/2013 | Hong et al. ............. 29/603.16 |
| 2005/0237676 | A1 | 10/2005 | Gill |
| 2006/0114620 | A1 | 6/2006 | Sbiaa et al. |
| 2012/0229935 | A1 * | 9/2012 | Song et al. ............ 360/313 |
| 2012/0275062 | A1 | 11/2012 | Gao |
| 2012/0281319 | A1 | 11/2012 | Singleton et al. |
| 2013/0242431 | A1 * | 9/2013 | Hosomi et al. .......... 360/119.02 |

FOREIGN PATENT DOCUMENTS

EP    1522991    4/2005

OTHER PUBLICATIONS

Kanai, Y. et al., "Finite-Element Model Analysis of Single-Pole-Type Head for 1 Tbit/in2," IEEE Transactions on Magnetics, vol. 39, No. 5, Sep. 2003, pp. 2405-2407.
Escobar M. et al., "Advanced Micromagnetic Analysis of Write Head Dynamics Using Fastmag," IEEE Transactions on Magnetics, vol. 48, No. 5, May 2012, pp. 1731-1737.
Anderson, G.W. et al., "Spin-valve Thermal Stability: The effect of Different Antiferromagnets," Journal of Applied Physics, vol. 87, No. 9, May 1, 2000, pp. 5726-5728.
Sbiaa, R. et al., "Magnetoresistance and Thermal Stability Enhancement in FeCr-based Spin Valves," Journal of Applied Physics, vol. 84, No. 25, Jun. 21, 2004, pp. 5139-5141.

* cited by examiner

*Primary Examiner* — Mark Blouin
(74) *Attorney, Agent, or Firm* — Zilka-Kotab, PC

(57) ABSTRACT

A magnetic sensor having improved pinned layer robustness for improved reliability and having improved side shielding for improved track resolution at very high data densities. The sensor has a pinned layer structure with laterally extending wing portions that become thicker with increasing distance from the air bearing surface and has a side shield structure has a thickness that decreases with increasing distance from the air bearing surface.

21 Claims, 19 Drawing Sheets

MAGNETIC READ SENSOR WITH NOVEL PINNED LAYER AND SIDE SHIELD DESIGN FOR IMPROVED DATA TRACK RESOLUTION AND MAGNETIC PINNING ROBUSTNESS

FIELD OF THE INVENTION

The present invention relates to magnetic data recording and more particularly to a magnetic read sensor with a side shield and extended pinned layer design that improves side shielding while also improving pinned layer pinning.

BACKGROUND

A magnetoresistance effect magnetic head is a part used as a sensor to reproduce magnetic information recorded on a magnetic recording medium in a magnetic recording device of high recording density, primarily a hard disk, and largely governs the performance of magnetic recording technology.

Magnetic reproducing heads utilizing the magnetoresistance effect of a multilayer film having ferromagnetic metal layers laminated with a nonmagnetic intermediary layer in between, or so-called giant magnetoresistance effect (hereafter, GMR), or the like, have been used in recent years. The GMR head initially used was a CIP (current-in-plane) head, in which an electric signal is charged parallel within the film surface. To improve recording density, TMR (tunneling magnetoresistance effect) heads and a CPP-GMR (current perpendicular to plane-giant magnetoresistance effect) heads were developed, which appeared to be useful for obtaining high output by narrowing the track width and narrowing the gap. The TMR head has become the mainstream in magnetic reproducing heads today. The TMR head and the CPP-GMR head, unlike the conventional GMR head, greatly differ from CIP heads in that the sense current travels in a direction perpendicular to the planes of the sensor layers, rather than parallel.

Refining the effective track width of a magnetoresistive sensor and obtaining a high S/N ratio are required to respond to the demand in recent years for even higher density recording. Although there is a phenomenon of information being read in the width direction of reproduction tracks from an adjacent or nearby track, or so-called side reading, this phenomenon can be suppressed by forming a side shield structure of a soft magnetic material arranged to the left and right of the sensor.

SUMMARY

The present invention provides a magnetic sensor that includes, a magnetic pinned layer structure having a center portion extending to an air bearing surface and first and second laterally extending wing portions having a tapered front surface that is recessed from the air bearing surface. The sensor also has a magnetic free layer structure having first and second sides, and a non-magnetic layer sandwiched between the magnetic free layer structure and the magnetic pinned layer structure. The sensor further includes first and second magnetic side shield structures extending laterally from the first and second sides of the magnetic free layer structure, the magnetic side shield structures each having a back edge that is tapered to follow the taper of the tapered front surface of the laterally extending wing portions of the magnetic pinned layer structure.

The sensor can be manufactured by a process that includes, depositing a magnetic pinned layer structure, depositing a non-magnetic layer over the magnetic pinned layer structure, and depositing a magnetic free layer structure over the magnetic pinned layer structure. A mask is formed over the pinned layer structure, non-magnetic layer and magnetic free layer structure, the mask having a track-width defining portion extending to an air bearing surface and having laterally extending wing portions that are recessed from an air bearing surface plane. Then, an ion milling is performed in such a manner to form the magnetic pinned layer structure with laterally extending wing portions that have a tapered front surface.

After this masking and ion milling process has been performed to form the novel pinned layer shape, an insulation layer and magnetic side shield layer can be deposited. This can form a novel side shield structure having a tapered back edge that conforms with the tapered front edge of the pinned layer structure.

The novel pinned layer shape and side shield shape optimizes magnetic side shield effectiveness for improved data track resolution at very high data densities. At the same time, the novel pinned layer shape improves magnetic pinning of the pinned layer structure, thereby improving sensor reliability and robustness.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
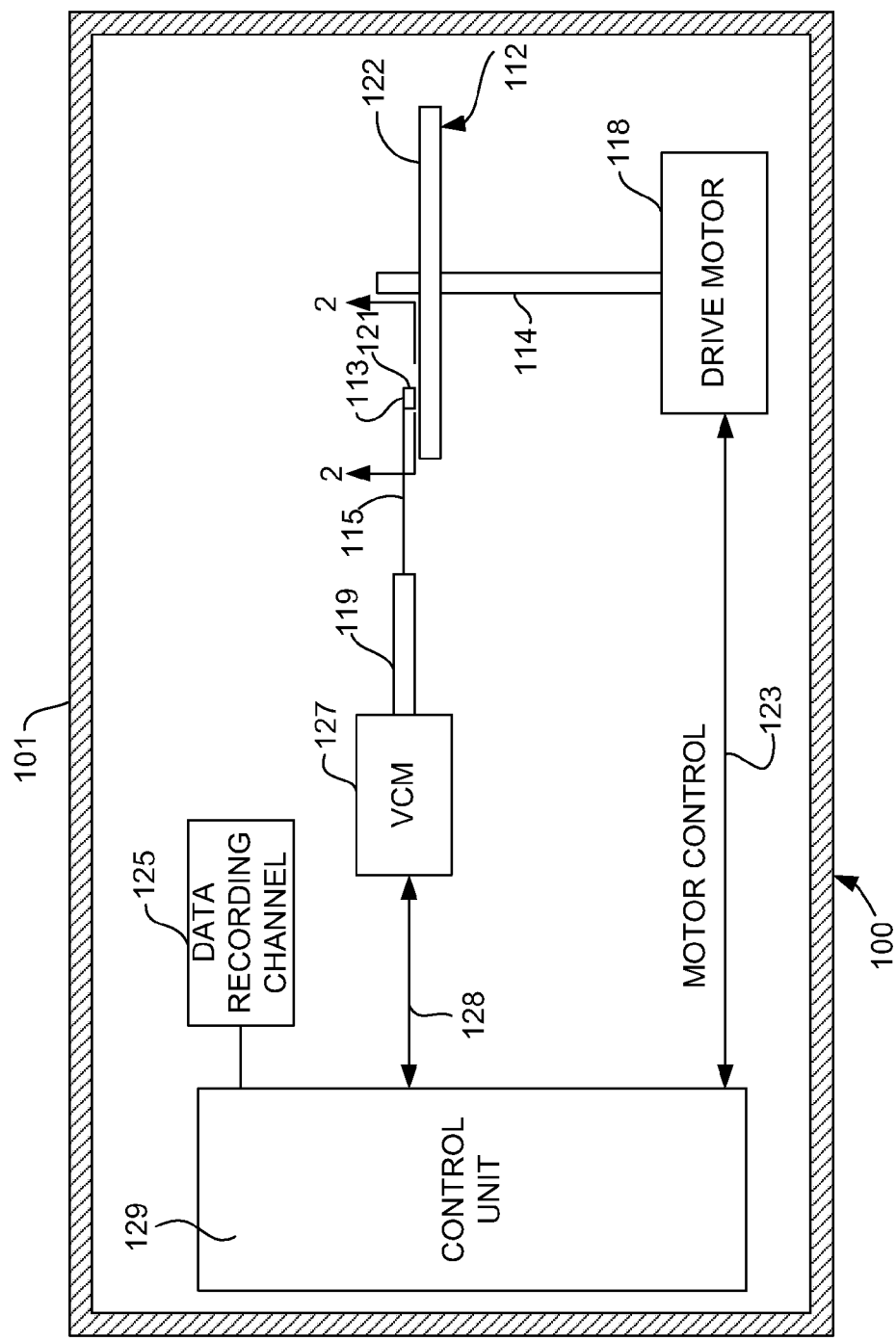
FIG. 1 is a schematic illustration of a disk drive system in which the invention might be embodied.

Referring now to FIG. 1, there is shown a disk drive 100 embodying this invention. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
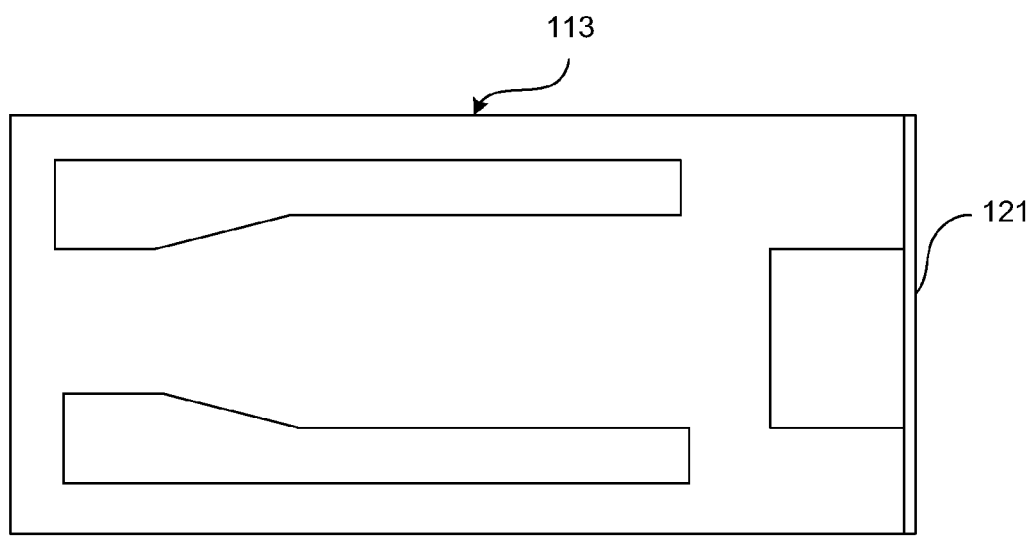
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
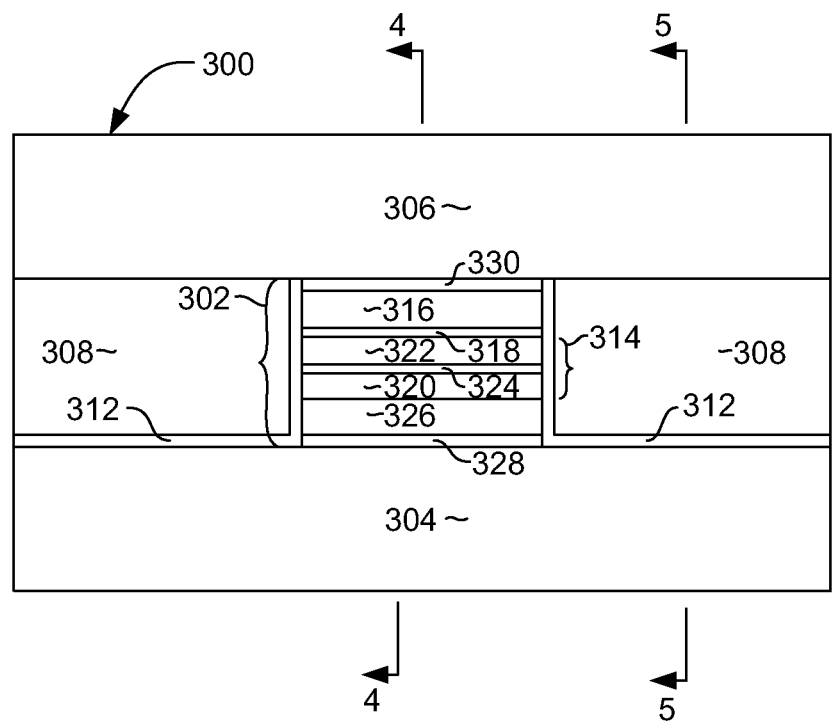
FIG. 3 is an air bearing surface view of a magnetic sensor.

FIG. 3 shows a magnetic sensor 300 that includes a sensor stack 302 that is sandwiched between a leading magnetic shield 304 and a trailing magnetic shield 306. The leading and trailing magnetic shields can be constructed of an electrically conductive, magnetic material such as NiFe so that they can function as electrically conductive leads as well as magnetic shields. The sensor also includes magnetic first and second magnetic side shields 308 at either side of the sensor stack 302. The first and second magnetic side shields are separated from the sensor stack 302 and from the bottom shield 304 by a non-magnetic, electrically insulating layer 312 in order to prevent sense current from being shunted through the sensor side shields 308.

The sensor stack includes a pinned layer structure 314, a magnetic free layer 316 and a non-magnetic barrier or spacer layer 318 sandwiched there-between. If the sensor 300 is a giant magnetoresistive sensor (GMR), then the layer 318 is a non-magnetic, electrically conductive spacer layer. On the other hand, if the sensor 300 is a tunnel junction magnetoresistive sensor (TMR), then the layer 318 is a thin, non-magnetic, electrically insulating barrier layer such as MgO.

The magnetic free layer 316 can be constructed of one or more magnetic materials and has a magnetization that is biased in a direction generally parallel with the air bearing surface (ABS) of the sensor, but which is free to move in response to a magnetic field, such as from a magnetic media. The magnetic free layer 316 can be formed of, for example, 5 nm of CoFeB and 2 nm of NiFe. The pinned layer structure 314 can be an anti-parallel coupled structure including first and second magnetic layers 320, 322 that are anti-parallel coupled across a non-magnetic anti-parallel coupling layer such as Ru, 324. The magnetic layers 320, 322 can be formed of, for example, CoFeB. The first magnetic layer 320 can be exchange coupled with a layer of anti-ferromagnetic material (AFM layer) 326. This exchange coupling pins the magnetization of the first magnetic layer 320 in a first direction that is perpendicular to the air bearing surface (ABS). The anti-parallel coupling between the first and second magnetic layers 320, 322, then, pins the magnetization of the second magnetic layer 322 in a second direction that is perpendicular to the air bearing surface and anti-parallel with the first direction. In addition to the pinned layer 314, free layer 316 and spacer/barrier layer 318, the sensor stack can also include a seed layer 328, such as Ta, at its bottom to induce a desired grains structure in the above deposited layers, and a capping layer 330 at its top to prevent damage to the underlying sensor layers during manufacture.

In order to increase data density, it is necessary to improve signal resolution by preventing reading of adjacent tracks. This allows data tracks to be spaced closer together, thereby increasing the number of data tracks the can be recorded and read in a given area of magnetic media. In addition, it becomes necessary to make the sensor ever smaller. However, as the sensor becomes smaller, the pinning strength of the pinned layer structure can suffer. The sensor structure disclosed herein provides improvement in both of these areas, providing strong robust pinning and improving data track resolution.

Figure 4:
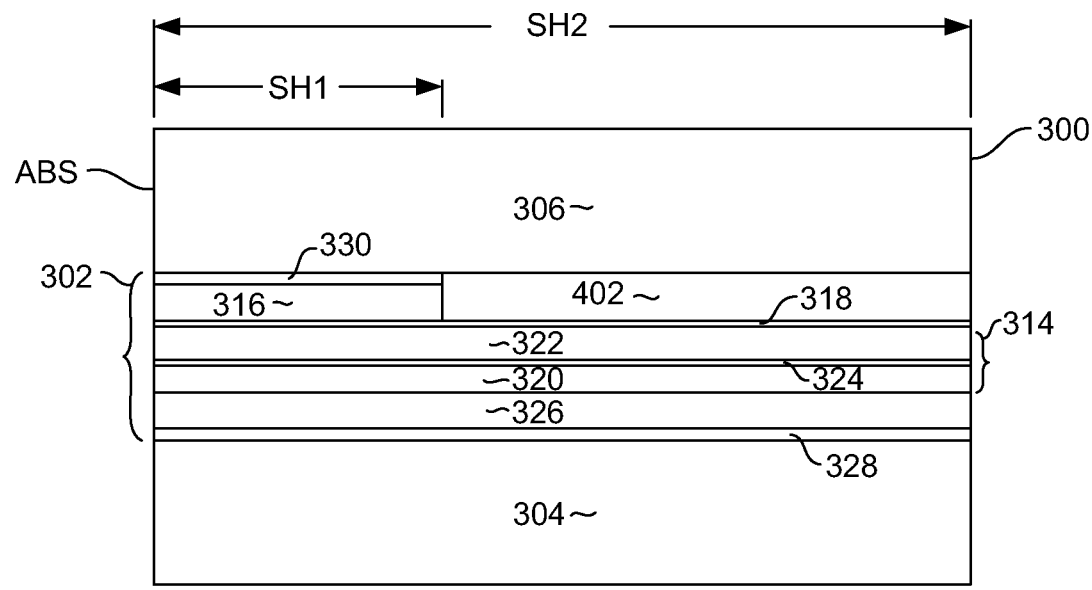
FIG. 4 is a side cross sectional view as seen from line 4-4 of FIG. 3.
Figure 5:
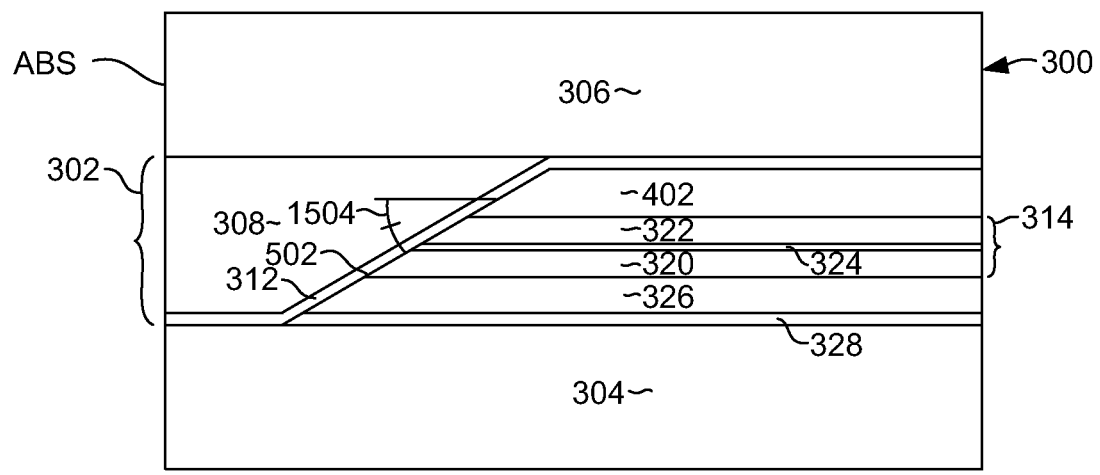
FIG. 5 is a side cross sectional view as seen from line 5-5 of FIG. 3.

With reference to FIGS. 4 and 5, a novel pinned layer structure 314 and novel side magnetic shield structure 308 can be better understood. FIG. 4 shows a side cross sectional view of a plane that is perpendicular to the air bearing surface at a location within the central portion of the sensors stack 302 as taken from line 4-4 of FIG. 3. FIG. 5 on the other hand shows a side cross sectional view of a plane that is perpendicular to the air bearing surface at an outer region within the side shield 308 as seen from line 5-5 of FIG. 3.

With reference now to FIG. 4 it can be seen that the free layer 316 extends to a first stripe height SH1, whereas the pinned layer structure 314 extends beyond this first stripe height to a second stripe height SH2. The space behind the free layer structure 316 can be filled with a non-magnetic, electrically insulating fill layer such as alumina 402. The first stripe height SH1 is a functional stripe height for purposes of sensor performance and resolution, however, extending the pinned layer beyond the first stripe height SH1 to the second stripe height SH2 improves pinning strength, thereby making the magnetic pinning of the magnetic pinned layer structure robust even at very small sensor sized.

With reference now to FIG. 5, which shows a side, cross sectional view of the sensor 300 in an outer region at the location of the side shield 308, it can be seen that the pinned layer structure 314 (as well as the AFM 326) and the magnetic side shield 308 taper in such a manner that the recessed portion of the pinned layer structure 314 becomes thinner as it moves toward the air bearing surface (ABS), whereas the magnetic side shield 308, becomes thinner as it moves away from the air bearing surface (ABS). The pinned layer structure 314 and AFM 326, therefore, have a tapered surface 502 that defines an angle 1504 relative to the plane of the sensor layers (e.g. parallel to the plane of the layers 320, 322, 324 or horizontal in FIG. 5). The angle 1504 is preferably 15-60 degrees and more preferably about 25 degrees. Another way to describe the tapered surface 502 is that it defines an angle of 75 to 30 degrees or more preferably about 65 degrees relative to the air bearing surface ABS.

Figure 6:
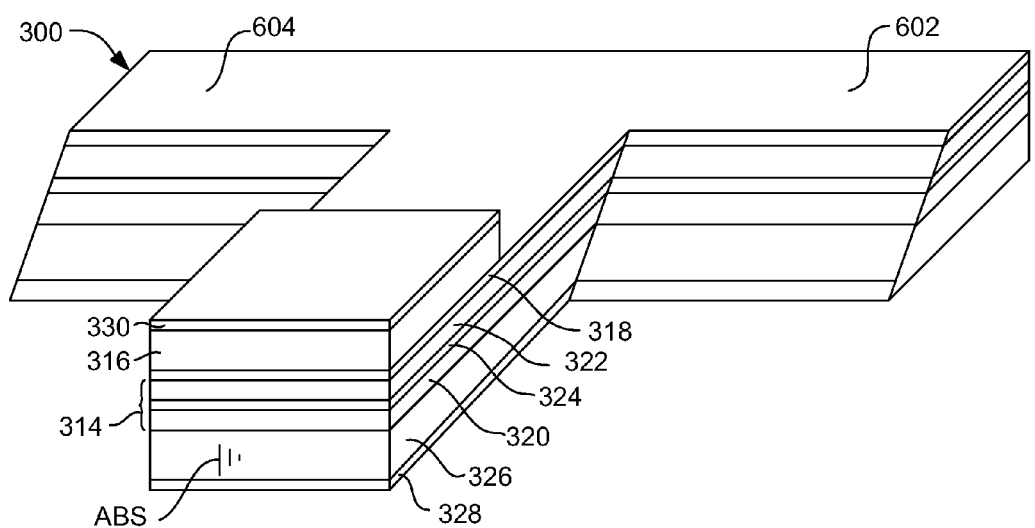
FIG. 6 is a perspective view of a portion of the sensor of FIGS. 3-6.

The shape and configuration of the free layer and pinned layer structure can be understood more clearly with reference to FIG. 6, which shows a perspective view of the sensor with only the pinned layer 314, free layer 316 and barrier layer 318 shown, the shields 304, 306 and side shields 308 having been removed. In FIG. 6 it can be seen that the pinned layer structure 314 has laterally extending wing portions 602, 604 at a region removed from the air bearing surface ABS. These wing portions are tapered as described above, such that they taper to a point, terminating at a location that is recessed from the air bearing surface. That is, the wing portions do not extend to the air bearing surface (ABS), or alternatively can terminate to a point at the air bearing surface.

Figure 7:
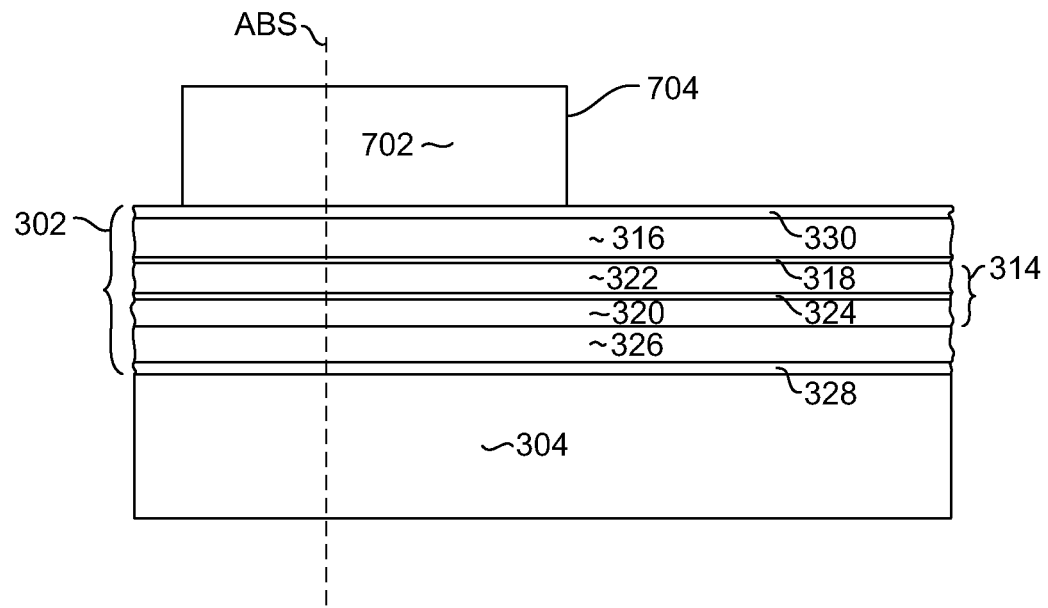
FIGS. 7-19 are views of a magnetic sensor shown in various intermediate stages of manufacture in order to illustrate a method for manufacturing a magnetic sensor.

FIGS. 6-19 show a magnetic sensor in various intermediate stages of manufacture in order to illustrate a method of manufacturing a magnetic sensor. With particular reference to FIG. 7, a bottom shield 304 is formed, and a series of sensor layers 302 are deposited over the shield 304. The sensor layers can include: a seed layer 328; an AFM layer 326; a pinned layer structure 314 with layers 320, 322, 324 as described above; a spacer/barrier layer 318; a free layer 316; and a capping layer 330. A stripe height defining mask 702 is then formed over the sensor layers 302. The stripe height defining mask has a back edge 704 that is located a desired distance from an air bearing surface plane (ABS) in order to define a stripe height of the free layer 316. The mask 702 can include a photoresist layer that has been photolithographically patterned, and can also include other layers as well, such as one or more hard mask layers an image transfer layer a bottom anti-reflective coating, etc.

Figure 8:
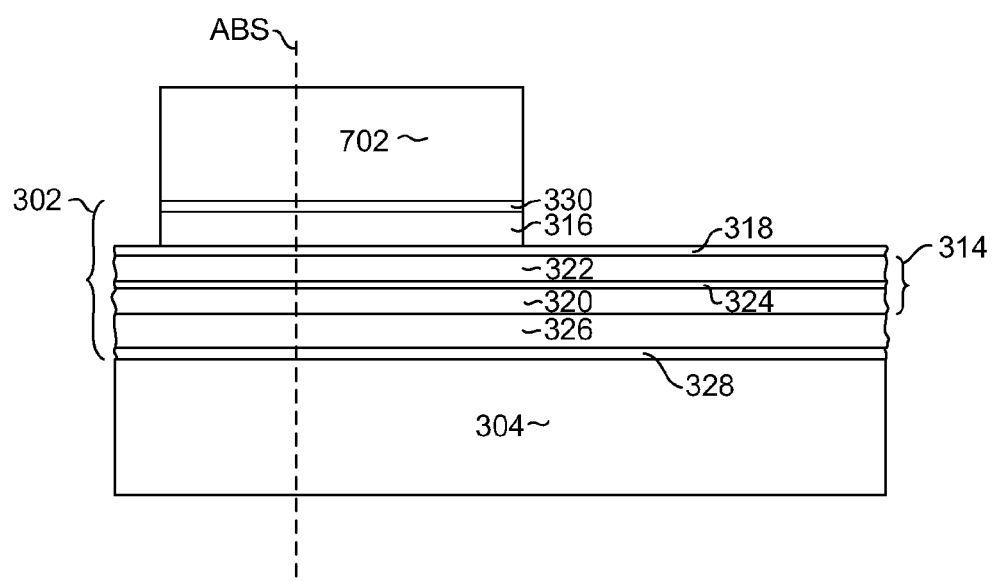
Figure 9:
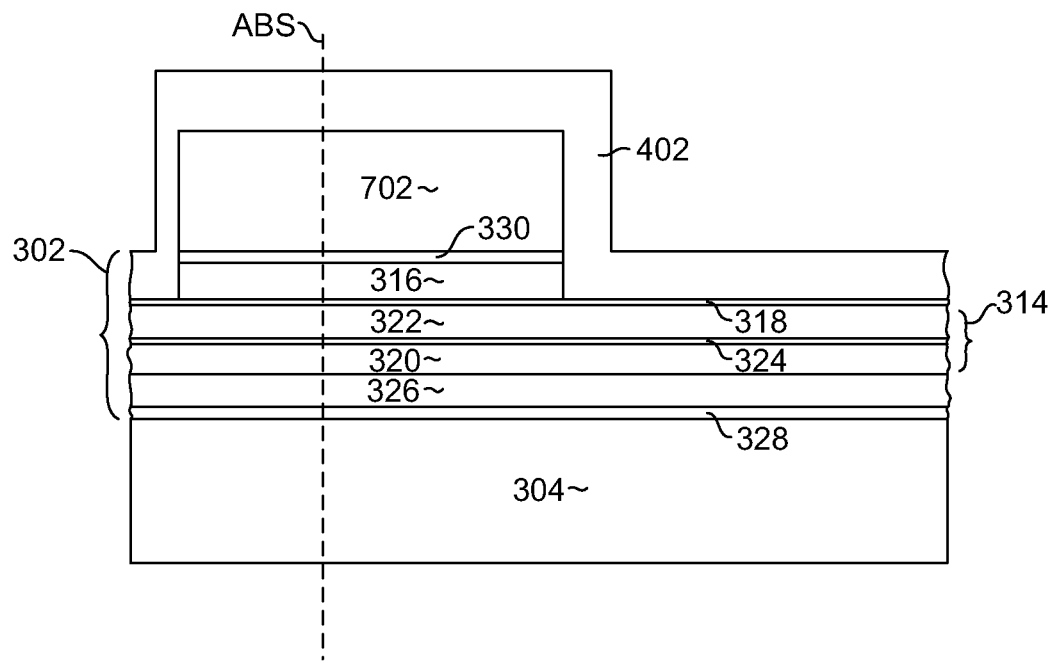
Figure 10:
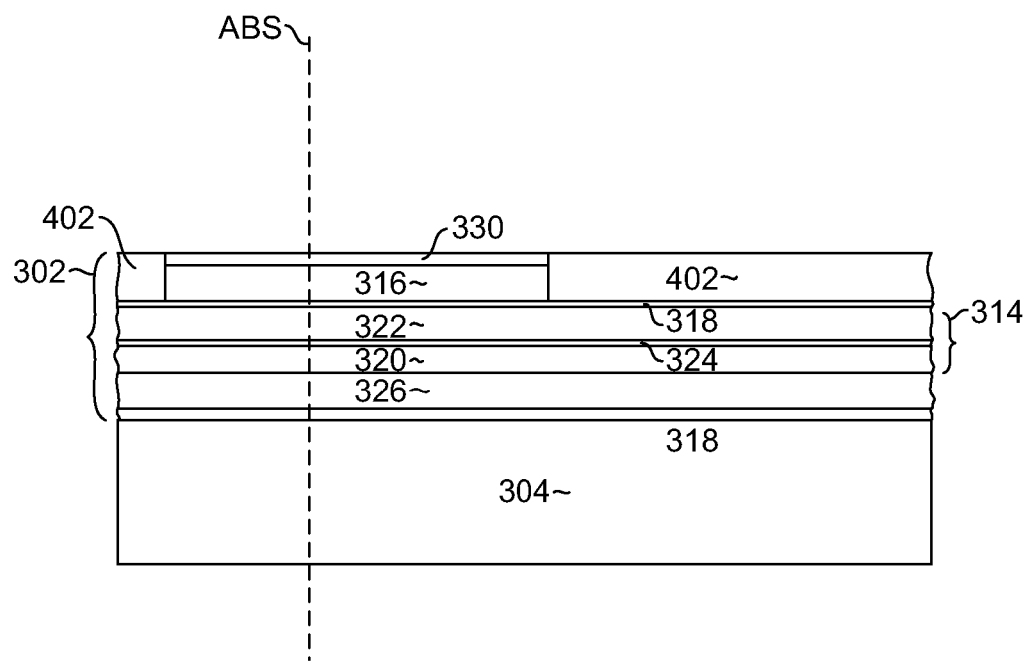

Then, with reference to FIG. 8 and ion milling is performed to remove portions of the free layer 316 and capping layer 330 that are not protected by the mask 702. The ion milling can be terminated when the barrier/spacer layer 318 has been reached or at some point within the barrier/spacer layer 318. Then, with reference to FIG. 9 a non-magnetic, electrically insulating fill layer such as alumina 402 is deposited to about the thickness of the free layer 316 and capping layer 330. A mask liftoff process and chemical mechanical polishing can then be performed, leaving a structure as shown in FIG. 10.

Figure 11:
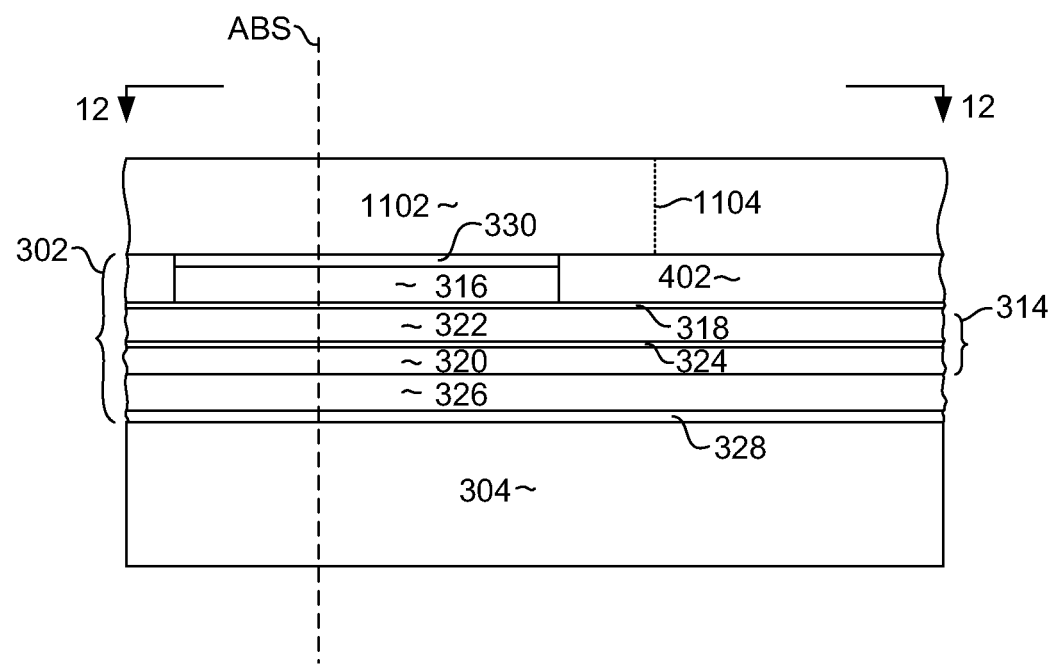

With reference now to FIG. 11, a second mask structure 1102 is formed over the sensor layers 302. This mask 1102 is configured to define a track-width of the sensor as well as defining a pinned layer/side shield layer taper. The configuration of the mask 1102 can be seen more clearly with reference to FIG. 12 which shows a top down view as seen from line 12-12 of FIG. 11. With reference to both FIGS. 11 and 12, it can be seen that the mask 1102 has a centrally located track-width defining portion 1102a that extends over the free layer 316 and capping layer 330, and has a pinned layer taper defining portion 1102b formed as outward extending wings at a location recessed from the ABS plane. The transition between portions 1102a and 1102b is indicated by a dashed line 1104 in FIG. 11.

Figure 12:
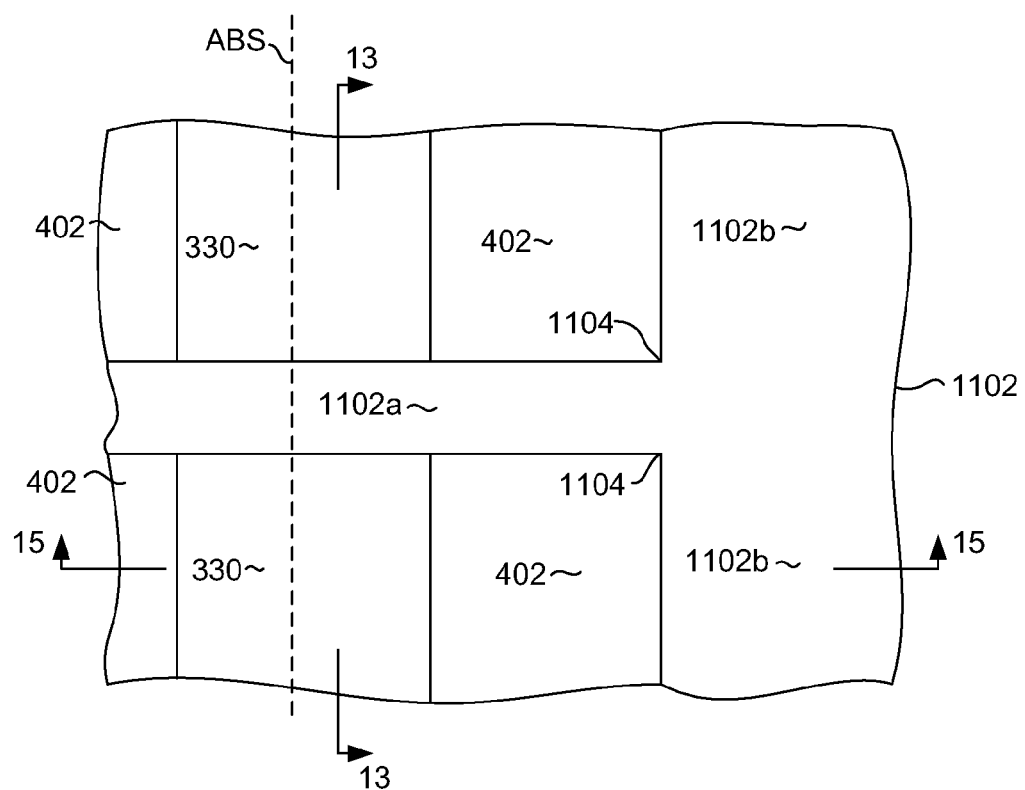
Figure 13:
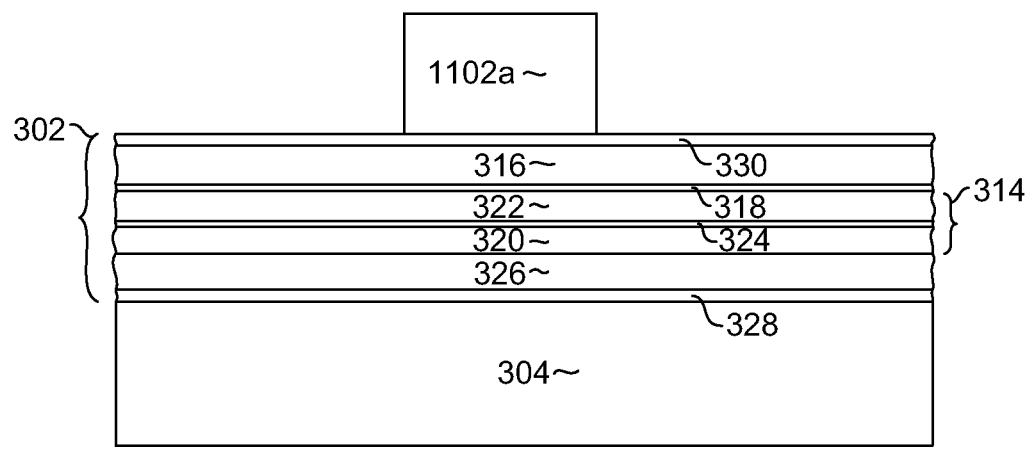
Figure 14:
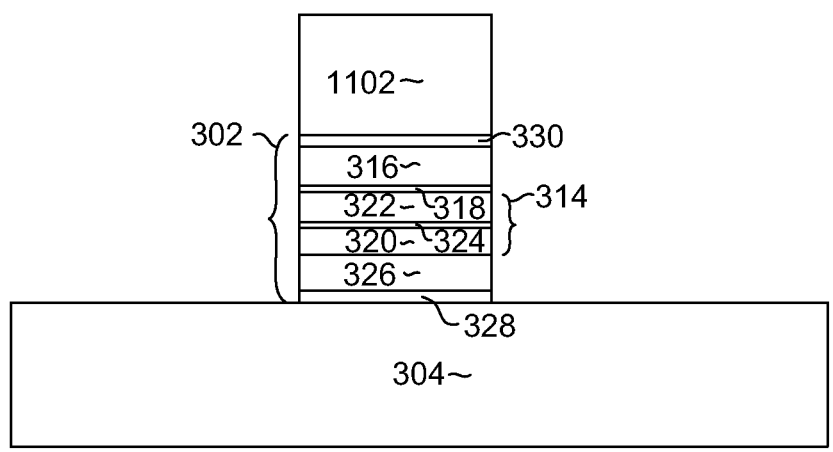
Figure 15:
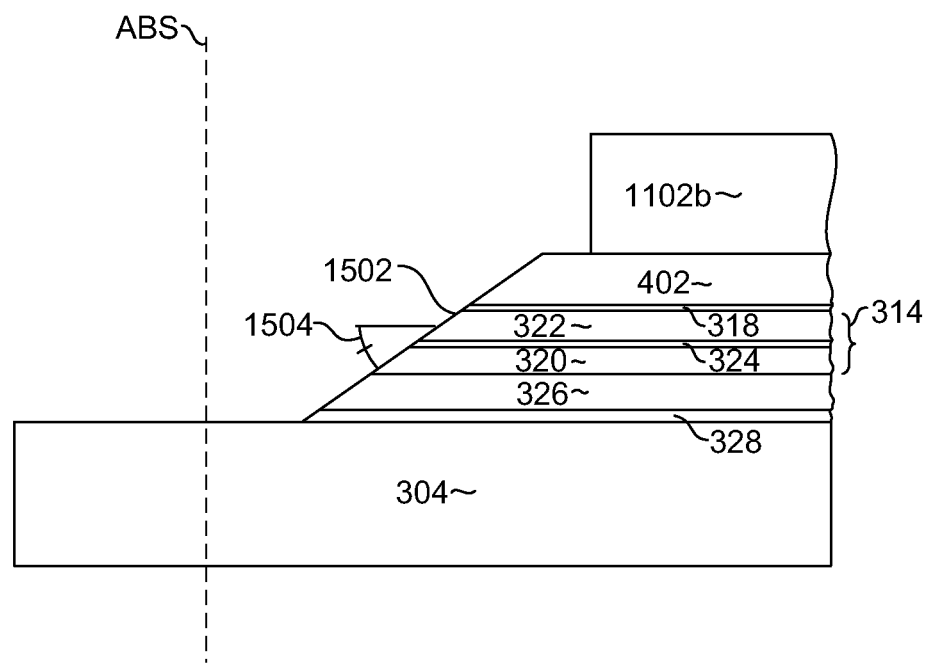

FIG. 13 shows a cross sectional view parallel with the ABS and shows how the track-width defining portion of the mask 1102a has a width that is configured to define a track-width of the sensor as seen from line 13-13 of FIG. 12. With the mask 1102 formed as described above, an ion milling is performed to remove material not protected by the mask 1102. The ion milling is preferably performed at an angle relative to normal and in a sweeping manner. FIG. 14 shows how this sweeping, angled ion milling forms the sensor with at track width in the location of where the free layer 316 remains. On the other hand, FIG. 15 shows a cross sectional view of a plane perpendicular with the air bearing surface at the location of line 15-15 of FIG. 12. In FIG. 15 it can be seen that the angled, sweeping ion milling forms a tapered surface 1502 as a result of shadowing from the mask 1102b.

The surface 1502 defines an angle 1504 relative to the as deposited plane of the layers 326, 320, 324, 322, 318, or relative to horizontal. The angle 1504 of the surface 1502 can be controlled by adjusting the height of the mask 1102b and by adjusting the angle at which the ion milling is performed and adjusting the sweep angle of the ion milling. The masking and ion milling process is preferably performed in such a manner as to result in the surface 1502 having an angle 1504 of 15-60 degrees, and more preferably about 25 degrees. In order to achieve this angle 1504, the ion milling is preferably performed at an angle of 5-60 degrees relative to normal, or more preferably about 30 degrees relative to normal.

Figure 16:
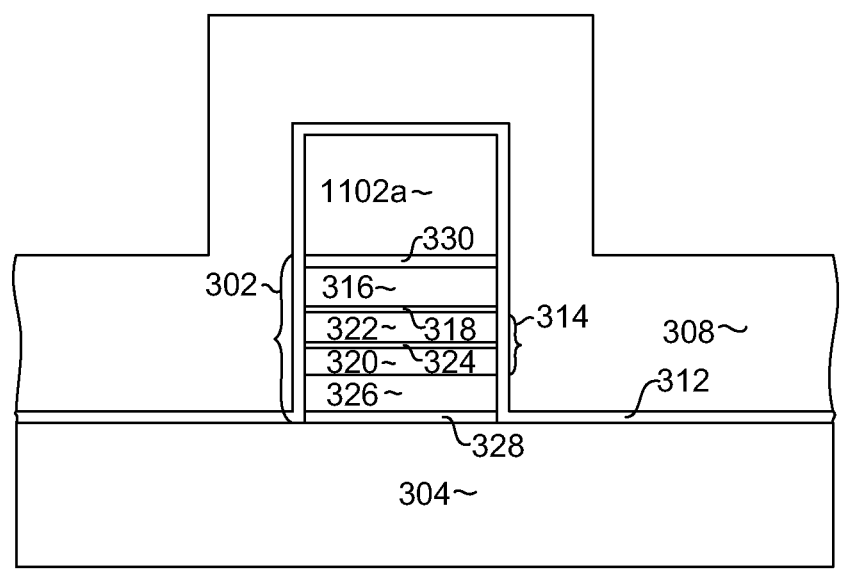
Figure 17:
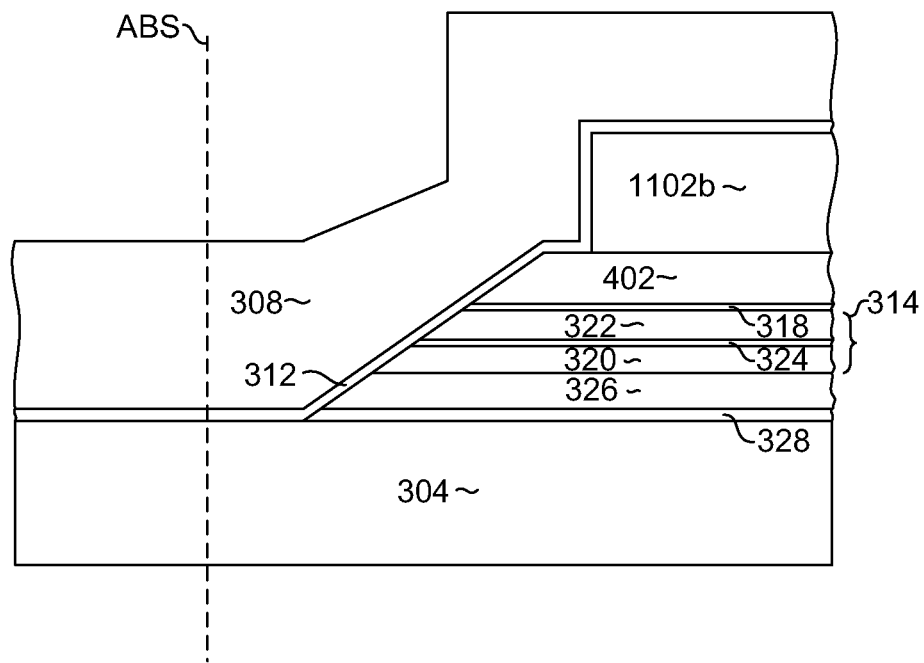
Figure 18:
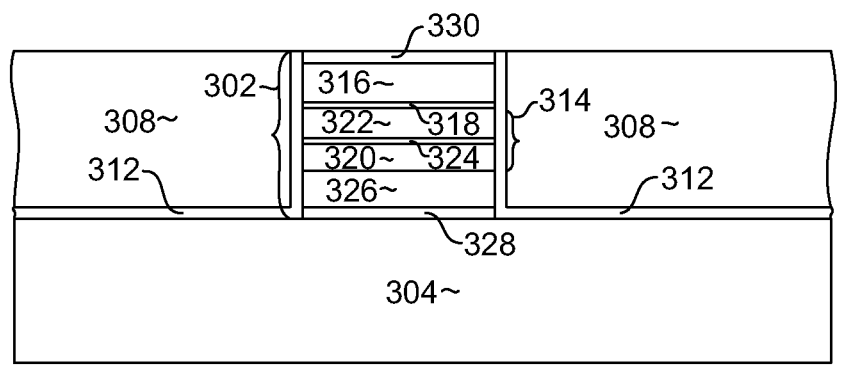
Figure 19:
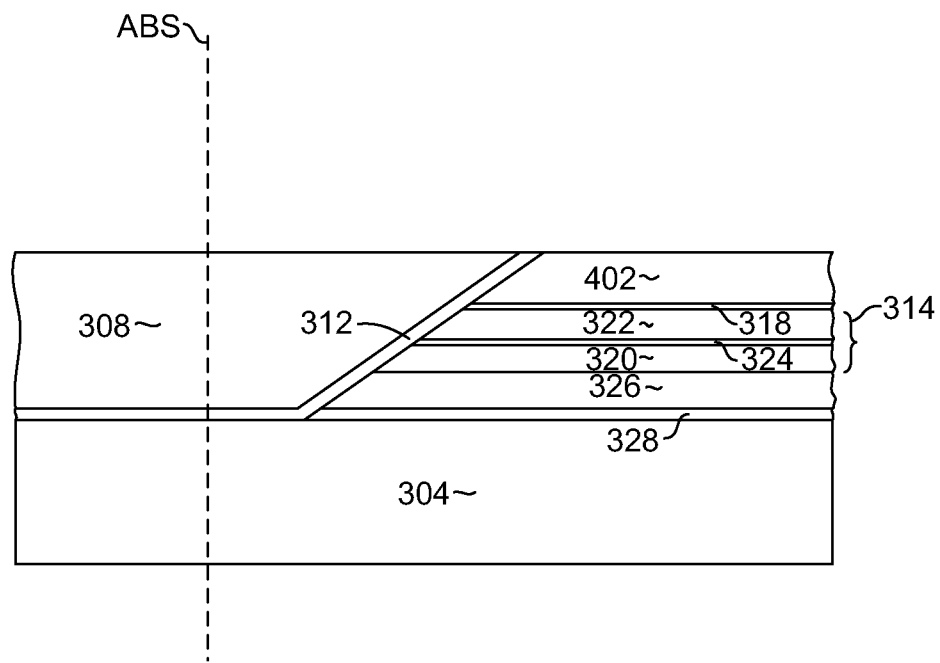

With reference now to FIG. 16, a thin, insulation layer 312 is deposited followed by a magnetic shield material 308. The insulation layer can be a non-magnetic, electrically insulating material such as alumina deposited by a conformal deposition process such as chemical vapor deposition or atomic layer deposition. The magnetic shield material can be a magnetic material having a relatively low coercivity, such as NiFe. FIG. 17 shows a side cross sectional view at the location of FIG. 15 after deposition of the insulation and magnetic shield material 312, 308. A mask liftoff process and chemical mechanical polishing can then be performed, leaving a structure as shown in FIGS. 18 and 19. After formation of the sensor as outlined above, an upper magnetic shield 306 can be formed by a process such as electroplating, leaving a sensor 300 as described above with reference to FIGS. 3, 4 and 5.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic sensor, comprising:
   a magnetic pinned layer structure having a center portion extending to an air bearing surface and first and second laterally extending wing portions each having a tapered front surface that is recessed from the air bearing surface;
   a magnetic free layer structure and having first and second sides;
   a non-magnetic layer sandwiched between the magnetic free layer structure and the magnetic pinned layer structure; and
   first and second magnetic side shield structures extending laterally from the first and second sides of the magnetic free layer structure, the magnetic side shield structures each having a back edge that is tapered to follow the taper of the tapered front surface of the laterally extending wing portions of the magnetic pinned layer structure.

2. The magnetic sensor as in claim 1 further comprising a non-magnetic, electrically insulating layer sandwiched between the back edge of the magnetic side shield structure and the tapered front surface of the laterally extending wing portion of the magnetic pinned layer structure.

3. The magnetic sensor as in claim 1 wherein the tapered front surfaces of the laterally extending wing portions of the magnetic pinned layer structure each define an angle of 30 to 75 degrees with respect to the air bearing surface.

4. The magnetic sensor as in claim 1 wherein the tapered front surfaces of the laterally extending wing portions of the magnetic pinned layer structure each define an angle of about 65 degrees with respect to the air bearing surface.

5. The magnetic sensor as in claim 1, wherein the laterally extending wing portions of the magnetic pinned layer structure get thicker with increasing distance from the air bearing surface.

6. The magnetic sensor as in claim 1, wherein the magnetic side shields get thinner with increasing distance from the air bearing surface.

7. The magnetic sensor as in claim 1, wherein the laterally extending wing portions of the magnetic pinned layer structure get thicker with increasing distance from the air bearing surface and the magnetic side shields get thinner with increasing distance from the air bearing surface.

8. The magnetic sensor as in claim 1, wherein the laterally extending wing portions of the magnetic pinned layer structure terminate at a point that is recessed from the air bearing surface.

9. The magnetic sensor as in claim 1, wherein the laterally extending wing portions of the magnetic pinned layer structure terminate at the air bearing surface.

10. The magnetic sensor as in claim 1, wherein the magnetic free layer structure extends to a first stripe height measured from the air bearing surface and the magnetic pinned layer structure extends to a second stripe height also measured from the air bearing surface, the second stripe height being longer than the first stripe height.

11. A method for manufacturing a magnetic sensor, comprising:
    depositing a magnetic pinned layer structure;
    depositing a non-magnetic layer over the magnetic pinned layer structure;
    depositing a magnetic free layer structure over the magnetic pinned layer structure;
    forming a mask over the pinned layer structure, non-magnetic layer and magnetic free layer structure, the mask having a track-width defining portion extending to an air bearing surface and having laterally extending wing portions that are recessed from an air bearing surface plane;
    wherein the ion milling forms the magnetic pinned layer structure with laterally extending wing portions that have a tapered front surface.

12. The method as in claim 11 wherein the ion milling is a sweeping ion milling performed at an angle so that shadowing from the mask forms the tapered front surface on the magnetic pinned layer structure.

13. The method as in claim 11 wherein the ion milling is a sweeping ion milling performed at an angle relative to normal.

14. The method as in claim 11 wherein the ion milling is a sweeping ion milling performed at an angle of 5-60 degrees relative to normal.

15. The method as in claim 11 wherein the ion milling is a sweeping ion milling performed at an angle of about 30 degrees relative to normal.

16. The method as in claim 11 wherein the ion milling forms the tapered front surface at an angle of 15-60 degrees relative to a plane of the as deposited magnetic pinned layer structure.

17. The method as in claim 11 wherein the ion milling forms the tapered front surface at an angle of about 25 degrees relative to a plane of the as deposited magnetic pinned layer structure.

18. The method as in claim 11, wherein a height of the mask and an angle of the ion milling are adjusted to form the tapered surface with an angle of 15-60 degrees relative to a plane of the as deposited magnetic pinned layer structure.

19. The method as in claim 11, wherein a height of the mask and an angle of the ion milling are adjusted to form the tapered surface with an angle of about 25 degrees relative to a plane of the as deposited magnetic pinned layer structure.

20. The method as in claim 11 further comprising, before forming the mask structure, forming a stripe height defining mask structure, performing a stripe height defining ion milling to remove portions of the magnetic free layer structure that are not protected by the stripe height defining mask structure and terminating the stripe height defining ion milling before the magnetic pinned layer structure has been reached.

21. The method as in claim 11, further comprising, after performing the ion milling, depositing a non-magnetic, electrically insulating layer, and depositing a magnetic shield layer over the non-magnetic, electrically insulating layer.

\* \* \* \* \*